United States Patent [19]
Wu

[11] Patent Number: 5,299,416
[45] Date of Patent: * Apr. 5, 1994

[54] CHAIN CONNECTOR

[76] Inventor: Chia-Long Wu, No. 734, Chung Shan Rd., Kuei Ren Hsiang, Tainan Hsien, Taiwan

[*] Notice: The portion of the term of this patent subsequent to Feb. 16, 2010 has been disclaimed.

[21] Appl. No.: 3,452

[22] Filed: Jan. 12, 1993

[51] Int. Cl.$^5$ .............................................. F16G 13/00
[52] U.S. Cl. ............................................ 59/85; 59/5; 59/7; 474/218; 474/223
[58] Field of Search .................... 59/4, 5, 7, 78, 85; 474/218, 220, 223

[56] References Cited

U.S. PATENT DOCUMENTS

| | | | |
|---|---|---|---|
| 586,472 | 7/1897 | Appleby | 474/220 |
| 628,386 | 7/1899 | Berry et al. | 474/220 |
| 891,189 | 6/1908 | Schmidt, Jr. | 474/220 |
| 4,043,215 | 8/1977 | Long et al. | 59/85 |
| 5,178,585 | 1/1993 | Lin et al. | 474/206 |
| 5,186,569 | 2/1993 | Wu | 59/85 |

Primary Examiner—David Jones
Attorney, Agent, or Firm—Bacon & Thomas

[57] ABSTRACT

A link for connecting a chain. The link has a first outer chain plate, a first pin, a second pin, and a second outer chain plate. The first outer chain plate has two circular holes. The pin has, at a first end, an enlarged flat head and, at a second end, a dome head near which a groove extends so as to form a neck. The second outer chain plate has a circular hole and a hole consisting of a relatively small semicircular hole overlapping partially with a relatively large semicircular hole. In a plant, the first pin is (a) inserted through a hole of the first outer chain plate, holes of two inner chain plates, and the circular hole of the second outer chain plate and (b) riveted at both heads to thereby combine these elements conventionally. The second pin is inserted through the other hole of the first outer chain plate and the enlarged flat head thereof is secured to the first outer chain plate. A bike rider can (a) insert the dome head of the second pin through holes of other two inner chain plates, (b) move the dome heads toward each other, whereby the dome head of the second pin is permitted to be inserted through the relatively large semi-circular hole, and (c) release the second pin to thereby permit the neck to be received in the relatively small semicircular hole.

5 Claims, 3 Drawing Sheets

CHAIN CONNECTOR

BACKGROUND OF THE INVENTION

The present invention relates to a chain connector.

The present inventor's co-pending U.S. application Ser. No. 07/680,905 filed Apr. 5, 1991 teaches a novel link for connecting a chain consisting of a plurality of conventional links including two terminal links each having two inner chain plates. The novel link has a first outer chain plate, two pins, and a second outer chain plate. The first outer chain plate has two circular holes. Each pin has, at a first end thereof, an enlarged flat head and, at a second end thereof, a flat head near which a groove extends to thereby form a neck. The second outer chain plate has two holes each consisting of a relatively large semicircular hole partially overlapping with a relatively small semicircular hole. A distance between centers of the relatively large semicircular holes is less than a distance between the pins, while a distance between centers of the two relatively small semicircular holes is the same as the distance between the pins.

To assemble a chain, (a) the flat head of each pin is inserted through circular holes of the first outer chain plate and of the inner chain plates of each terminal link of the chain; (b) the first outer chain plate is bent to thereby move the flat heads of the pins toward each other, thereby allowing each head to be inserted through each relatively large semicircular hole; and (c) the first outer chain plate is released, whereby each neck is received in each relatively small semicircular hole. When used, the chain is subject to a tension to thereby urge each neck to be received in each relatively small semicircular hole, thereby firmly connecting the chain.

The present inventor's co-pending U.S. application Ser. No. 07/816,429 filed Dec. 31, 1991 discloses a chain consisting of links as taught in the above-mentioned application. Therefore, the length of the chain is easily adjustable because each link could be disengaged therefrom without any tools.

A major problem of the above-mentioned application is that it is difficult to bend the pins and to maintain the outer chain plate in position at the same time. The present invention is intended to solve this problem.

SUMMARY OF THE INVENTION

The present invention provides a link for connecting a chain. The link has a first outer chain plate, a first pin, a second pin, and a second outer chain plate. The first outer chain plate has two circular holes. The pin has, at a first end, an enlarged flat head and, at a second end, a dome head near which a groove extends so as to form a neck. The second outer chain plate has a circular hole and a hole consisting of a relatively small semicircular hole overlapping partially with a relatively large semicircular hole. In a plant, the first pin is (a) inserted through a hole of the first outer chain plate, holes of two inner chain plates, and the circular hole of the second outer chain plate and (b) riveted at both heads to thereby combine these elements conventionally. The second pin is inserted through the other hole of the first outer chain plate and the enlarged flat head thereof is secured to the first outer chain plate. A bike rider can (a) insert the dome head of the second pin through holes of other two inner chain plates, (b) move dome heads toward each other, whereby the dome head of the second pin is permitted to be inserted through the relatively large semicircular, and (c) release the second pin to thereby permit the neck to be received in the relatively small semicircular hole.

For a better understanding of the present invention and objects thereof, a study of the detailed description of the embodiments described hereinafter should be made in relation to the accompanying drawings.

DETAILED DESCRIPTION OF THE PREFERRED EMBODIMENTS

Figure 1:
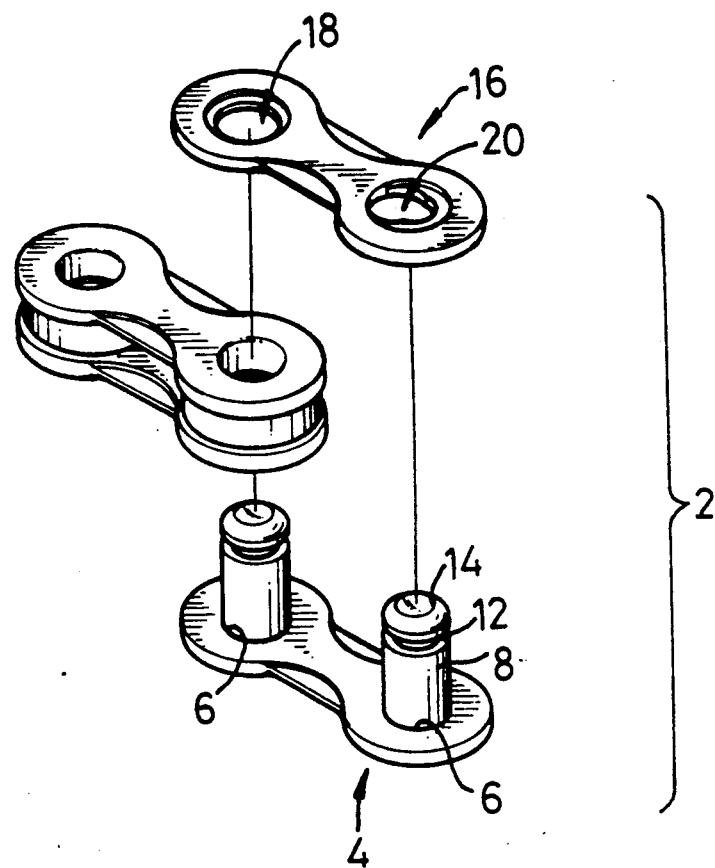
FIG. 1 is an exploded view of a link for connecting a chain in accordance with the present invention.

Referring to the drawings and, more particularly, to FIG. 1, in accordance with the present invention, a link 2 has a first outer chain plate 4 having two circular holes 6, two pins 8 each having at a first end an enlarged flat head 10 (see FIG. 2) and at a second end a neck 12 integrally connected with a dome head 14, and a second outer chain plate 16 having a circular hole 18 and a hole 20 consisting of a relatively large semicircular hole overlapping partially with a relatively small semicircular hole. The enlarged flat head 10 is larger than the hole 6, the neck 12 is smaller than the dome head 14, and the dome head 14 is slightly larger than the hole 6. The relatively large semicircular hole is slightly larger than the dome head 14 which is larger than the relatively small semicircular hole which is slightly larger than the neck 12. The relatively large semicircular hole is closer in size to the hole 18 than the relatively small semicircular hole is.

Figure 2:
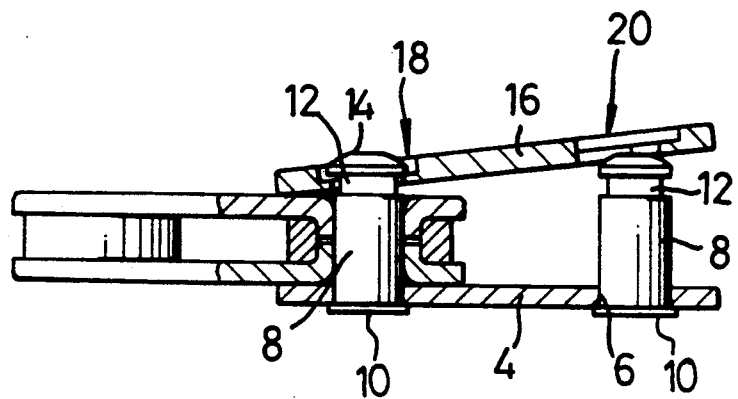
FIG. 2 is a partially cross-sectional view of a link in accordance with the present invention.

Referring to FIG. 2, as manufactured in a plant, each pin 8 is inserted through each hole 6, with the enlarged flat head 10 riveted to thereby secure each pin 8 to the outer chain plate 4. The dome head 14 of one of the pins 8 is (a) inserted through two inner chain plates of a terminal link of a chain, (b) forced through the hole 18, and (a) riveted, thereby combining the inner chain plates, the outer chain plates 4 and 16, and the pin 8. Generally, a chain is manufactured to the above-mentioned extent in order to be sold to a retailer that might in turn sell the chain to a bike rider. It should be noted that the pin to be inserted in the hole 18 could be replaced with a conventional pin, as the inner chain plates and the outer chain plates 4 and 16 are combined in a conventional way.

Figure 3:
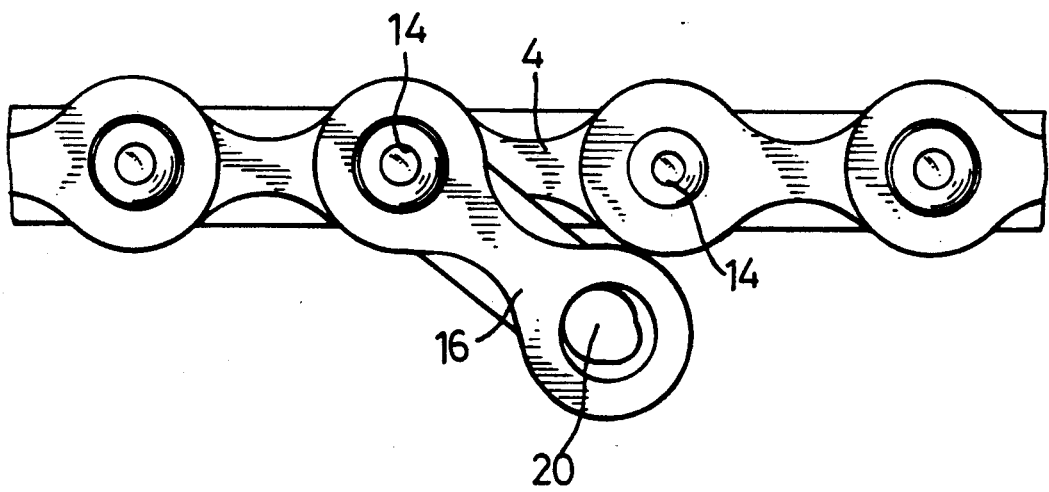
FIG. 3 is a plane view of a link before connecting two terminal links of a chain in accordance with the present invention.

Referring to FIG. 3, the outer chain plate 16 is pivoted to a position where the dome head 14 of the other pin 8 is permitted to be inserted through two inner chain plates of the other terminal link of the chain.

Figure 4:
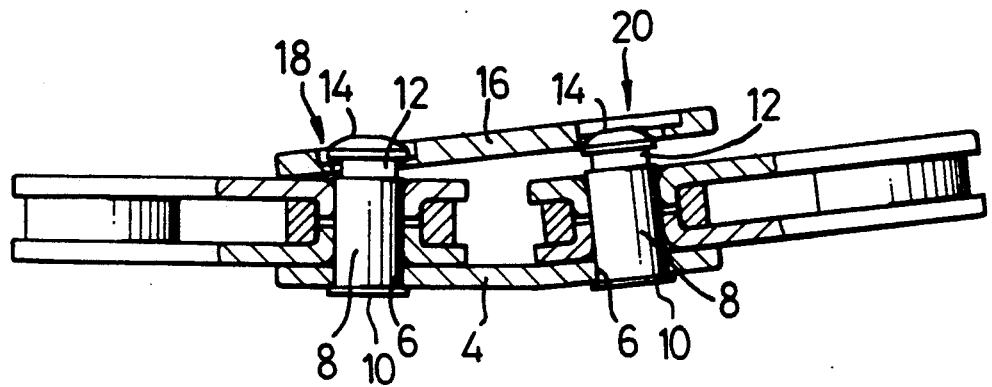
FIG. 4 is a partially cross-sectional view of a link when connecting two terminal links of a chain in accordance with the present invention.

Referring to FIG. 4, the outer chain plate 4 is bent slightly, whereby the dome heads 14 of the pins 8 are moved closer to each other. The dome head 14 is inserted through the relatively large semicircular hole.

Figure 5:
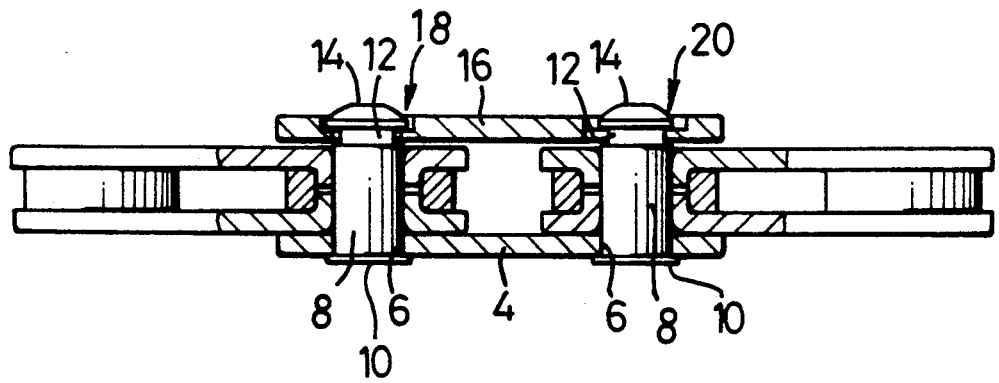
FIG. 5 is a partially cross-sectional view of a link after connecting two terminal links of a chain in accordance with the present invention.

Referring to FIG. 5, the outer chain plate 4 is released whereby the pins 8 are caused to be parallel to each other because of a recovering force of the outer chain plate 4. The neck 12 is received in the relatively small semicircular hole. When used, the chain is subject to tension which is apt to pull the pins 8 away from each other, whereby the neck 12 of the other pin 8 is securely received in the relatively small semicircular hole. As the dome head 14 is larger than the relatively small semicircular hole, the dome head 14 is not permitted to break free from the hole 20, i.e., the chain is securely connected.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. A link for connecting two terminal links of a chain, comprising:

a first outer chain plate having a first circular hole and a second circular hole;

a second outer chain plate having a circular hole and a figure-eight hole consisting of a relatively large semicircular hole partially overlapping with a relatively small semicircular hole distal from the circular hole;

a first pin being inserted through the first circular hole of the first outer chain plate, holes of two inner chain plates of a first terminal link of the chain, and the circular hole of the second outer chain plate and riveted at both ends thereof, thereby combining said first outer chain plate, the inner chain plates of the first terminal link of the chain, and the second outer chain plate; and a second pin having, at a first end, an enlarged flat head and, at a second end, a dome head near which a groove extends to thereby form a neck, said dome head of said second pin being insertable through said second hole of said first outer chain plate, holes of two inner chain plates of a second terminal link of the chain, and said relatively large semicircular hole of said second outer chain plate, thereby permitting the neck to be received in the relatively small semicircular hole of said second outer chain plate.

2. A link in accordance with claim 1, wherein a distance between a center of said relatively large semicircular hole and said circular hole of said second outer chain plate is less than a distance between a center of said relatively small semicircular hole and a center of said circular hole of said second outer chain plate.

3. A link in accordance with claim 2, wherein said distance between said relatively small semicircular hole and said circular hole of said second outer chain plate is the same as a distance between centers of said circular holes of said first outer chain plate.

4. A link in accordance with claim 1, wherein said first pin is a conventional chain pin.

5. A link in accordance with claim 1, wherein said first pin has at a first end an enlarged flat head and at a second end a dome head near which a groove extends to thereby form a neck.

* * * * *